United States Patent Office 3,547,766
Patented Dec. 15, 1970

3,547,766
LAMINATED ARTICLE
Edward Chu, Philadelphia, Pa., assignor to E. I. du Pont de Nemours and Company, Wilmington, Del., a corporation of Delaware
No Drawing. Filed Nov. 25, 1966, Ser. No. 596,752
Int. Cl. B32b *17/10, 27/08, 27/30*
U.S. Cl. 161—190                                    4 Claims

ABSTRACT OF THE DISCLOSURE

A liquid composition is provided which is useful for the formation of adherent sunlight-resistant coatings and bonding layers on glass and acrylic plastic members; this composition is a dispersion in a volatile organic liquid of certain amounts of (a) certain amino-containing methyl methacrylate polymers, (b) certain silane compounds, and (c) certain pigments. Also provided are composite articles having a dried layer of the composition in adherent contact with a layer of glass or acrylic plastic; preferred articles have a layer of polyurethane elastomer in interposed adherence with said dried layer and a layer of metal or other solid structural material, for example an automobile windshield assembly.

---

This invention relates to a liquid film-forming composition adapted for use in the application of adherent coatings and bonding layers on glass or acrylic plastic articles. The invention also relates to a composite article obtained by coating or priming a glass or acrylic plastic member with the composition, for example before bonding or laminating said member to metal or to other solid materials by means of an elastomeric adhesive.

The coating and laminating industries are in need of a liquid film-forming composition which can be applied to the surface of a glass or acrylic plastic member and which has strong adhesion to said surface after the layer of liquid composition applied to said surface is solidified and the resulting composite article is exposed to sunlight for an extended period of time. There is particular need for such a composition adapted for use in the formation of a solid adherent interlayer between a transparent or translucent glass or acrylic plastic member and a solid (non-liquid) polyurethane elastomer layer, especially when the resulting composite article is to be exposed to sunlight for an extended period of time.

The term "acrylic plastic" herein means a solid polymer selected from the group consisting of poly(alkyl acrylates) and poly(alkyl methacrylates) wherein the alkyl radical contains 1 to 8 carbon atoms.

In a broad sense, the liquid film-forming composition of the present invention is a dispersion in a volatile organic liquid of:

(A) about 30 to 80% of a polymer of methyl methacrylate containing an amino residue as described in claim 1 of U.S. Pat. 2,949,445,
(B) about 0.1 to 40.0% of a silane compound selected from (1) those which contain an epoxy group, (2) gamma-aminopropyl-triethoxysilane and -trimethoxysilane and (3) N,N'-bis(hydroxyethyl)-gamma aminopropyl-triethoxysilane and -trimethoxysilane, and
(C) about 0.6 to 10.0% of an opaque pigment, said percentages being based on the total weight of nonvolatile ingredients in the composition.

The composition of this invention can also contain about 1 to 40% of an acrylic polymer (ingredient D) from the group consisting of poly(alkyl acrylates) and poly(alkyl methacrylates) wherein the alkyl radical contains 1 to 8 carbon atoms, said percentage being based on the total weight of nonvolatile ingredients in the composition.

The composite article of the present invention, stated broadly, comprises:

(J) a layer of glass or acrylic plastic and
(K) a dried layer of the novel composition defined above in adherent superposed contact with (J).

In preferred embodiments of the invention, the composite article also comprises (L) a layer of polyurethane elastomer in adherent superposed contact with (K) and
(M) in adherent superposed contact with (L), a layer of a solid material from the group consisting of metal, glass, wood, plastic, leather, cement compositions and ceramics.

Ingredient (A) of the composition is preferably a methyl-methacrylate-hydroxyamino-propyl resin prepared substantially as described in Example 1 of U.S. Pat. 2,949,445. The composition preferably contains about 50 to 60% of ingredient (A) based on the weight of nonvolatile ingredients.

Ingredient (B) of the composition is preferably either beta-(3,4-epoxy-cyclohexyl)-ethyl - trimethoxysilane or gamma-glycidoxy-propyl-trimethoxysilane, or a blend of these two silanes. The corresponding triethoxysilanes are also very useful. The composition preferably contains about 2.0 to 4.0% of ingredient (B) by weight of nonvolatile ingredients.

Ingredient (C) is an opaque pigment, preferably carbon black and preferably present in an amount equal to about 4.0 to 5.0% by weight of the nonvolatile ingredients present in the composition. The opaque pigment must be resistant to decomposition by sunlight and must be able to provide the composition with sufficient opacity so that a dried layer of the composition in the thickness desired for a particular application is highly impervious to rays of light, especially direct sunlight. In preferred embodiments of the invention, the dried layer prevents about 50–100% of direct sunlight from passing through the layer of composition. Useful pigments other than carbon black are exemplified by titanium dioxide, aluminum flake and other metallic pigments, graphite, zinc oxide, lithopone, iron oxide, lead chromate and molybdate orange. The composition can also contain pigments sometimes referred to as pigment extenders, for example, calcium carbonate, talc, barytes, asbestine, china clay, silica and fine mica.

The acrylic polymer (ingredient D), when present in the composition, is preferably poly(methyl methacrylate). The composition preferably contains about 15 to 20% of ingredient (D) based on the weight of nonvolatile ingredients. In some applications, however, useful results are obtained when the composition contains as little as 1 to 5%, or even none, of ingredient (D).

The composition also preferably contains about 15 to 30% (based on the weight of nonvolatile ingredients) of a plasticizer selected from those which are known to be useful for enhancing the flexibility of acrylic polymers.

In a preferred embodiment of the composite article of the present invention, the layer of glass (J) is an automobile windshield (i.e., the peripheral portion thereof), and layer (M) is the windshield-receiving member (usually painted steel) of an automobile body.

In another embodiment of the invention, two solid layers glass are primed on one side with the novel film-forming composition, and the glass layers are bonded to each other by providing a layer of polyurethane elastomer in adherent interposed contact with the primed surfaces of the two glass layers.

The thickness of layer (K), the dried layer of the novel composition, is selected to give the desired level of adhesion and opacity in the particular application, preferably about 0.5 to 2.0 mils.

The polyurethane elastomer bonding layer (L) of the preferred composite article is prepared from a liquid polyurethane composition which is capable of being converted to a substantially solid (non-liquid) resilient polyurethane polymer (or elastomer) after it is placed in interposed contact with the layer of primed glass or acrylic plastic and the layer (M) being bonded thereto.

The liquid polyurethane composition can consist essentially of (a) an isocyanate-terminated polyurethane capable of reacting with water vapor in the air to form a solid elastomer (e.g., the urethane adhesive classified as Type II by the American Society for Testing Materials), or (b) a mixture of an isocyanate-terminated polyurethane and a compound having a plurality of groups bearing active hydrogen atoms which groups are capable of reacting with the isocyanate groups to form a solid elastomer. Among the useful active hydrogen-containing compounds are low molecular weight polyols, organic diamines and mixtures thereof. Such liquid compositions are well known in the art; a skilled polyurethane chemist will have no difficulty in selecting a liquid polyurethane composition suitable for use in the present invention after reading the present disclosure. Catalysts, coloring agents, viscosity-controlling agents, stabilizers, adhesion-enhancing agents and other additives known to be useful in liquid polyurethane compositions can be added to the liquid composition. Among the useful polyurethanes are those described in U.S. Pat. 2,984,645 column 5, line 26 to column 7, line 45.

The isocyanate-terminated polyurethanes can be prepared by agitating a molar excess of an organic disocyanate with a polyalkyleneether glycol, a polyalkyleneetherthioether glycol, a hydroxyl-terminated polyaliphatic hydrocarbon, a polyester containing a plurality of hydroxyl groups, or a tetrol made by reacting ethylenediamine sequentially with about 44 molar equivalents of 1,2-propylene oxide and about 11 molar equivalents of ethylene oxide. It is to be understood that mixtures of the foregoing polyols may be employed, if desired.

The polyurethane elastomer bonding layer can be prepared by a procedure (not part of the present invention) comprising impregnating a layer of open-cell polyurethane foam with a liquid polyurethane composition as described above, placing the layer of impregnated polyurethane foam in interposed contact with the layers to be bonded, and while maintaining intimate contact between the assembled layers, subjecting the liquid polyurethane composition to reaction conditions sufficient to convert it in situ to a solid polyurethane elastomer.

In the procedure described in the previous paragraph, the open-cell polyurethane foam can be replaced with another suitable porous material having the resilience and porosity needed for the particular application, for example strips and sheets of open-cell foams or open-cell structures of other synthetic polymers, woven and nonwoven fabrics, and cords and bulky elastic yarns.

The polyurethane elastomer bonding layer can also be prepared by mixing a thickening agent (e.g., finely-divided silica) with the liquid polyurethane in an amount sufficient to provide a relatvely visicous adhesive composition, and extruding or spreading the resulting composition onto either or both of the layers to be bonded.

The liquid film-forming composition of this invention has beneficial utility for the formation of adherent coatings and bonding layers on glass and acrylic plastic articles. When a clean glass article is coated with the novel composition, the dried coating has unexpectedly good adhesion to the glass surface even after the coated article has been exposed for extended periods of time to high humidity and/or to sunlight. The dried coating can be used to provide protection or decoration to the surface, or it can be used as a heat-seal adhesive; for example, various sheet materials can be bonded to the coated glass (or acrylic plastic) surface by means of heat and pressure.

When a liquid polyurethane adhesive as described above is placed in interposed contact with the coated side of the glass (or acrylic plastic) article and an article of metal or other solid material, and the adhesive is converted to a solid polyurethane elastomer, the strength of the bond between the two articles remains surprisingly strong even after the bonded assembly has been exposed for extended periods of time to high humidity and/or to sunlight.

The examples which follow are given for the purpose of illustrating the invention. All quantities shown are on a weight basis unless otherwise indicated.

EXAMPLE IA

An automatic windshield made of ¼-inch thick safety glass is resiliently and sealingly bonded by means of a composite bonding layer to the steel windshield-receiving member of an automobile body as follows.

The peripheral portion of the windshield surface which will be in contact with the bonding layer is prepared by (a) washing it with a composition consisting of one part isopropanol, one part butyl carbitol and 98 parts water and wiping it with a clean, dry cloth, (b) brushing on a coat of a primer having the composition given under Formula A below and allowing it to dry for 30 minutes at 25° C. The total dry film thickness of the primer is 0.001 inch.

FORMULA A

|  | Parts |
|---|---|
| Solution of methyl-methacrylate-hydroxy-aminopropyl resin [1] | 44.6 |
| Poly(methyl methacrylate), 40% solution in a 33/67 blend of acetone and toluene | 5.5 |
| Acrylic resin/carbon black dispersion [2] | 12.2 |
| Xylene | 30.1 |
| Cellosolve acetate | 0.3 |
| Butyl benzyl phthalate | 6.8 |
| Gamma-glycidoxy-propyl-trimethoxysilane | 0.5 |
|  | 100.0 |

[1] Made as described in Example 1 of U.S. Pat. 2,949,445; added as a 30% solution in a 56/44 blend of toluene and isopropanol.
[2] Prepared by mixing 35 parts xylene, 50 parts poly(methyl methacrylate), 10 parts carbon black, grinding the mixture thoroughly in a ball mill and adding 5 parts xylene.

The portion of the windshield-receiving member which will be in contact with the bonding layer is prepared by (1) applying a zinc phosphate coating ("Bonderite" 100), (2) spraying on a 0.001-inch thick coat (dry film thickness) of a primer having the composition given under Formula B below and baking it for 30 minutes at 196° C., (3) spraying on a 0.025-inch thick coat (dry film thickness) of a known automobile enamel (as described in Example 10 of U.S. Pat. 2,934,509) and baking it for 30 minutes at 135° C., and (4) brushing on a coat of a primer having the composition given under Formula A above and allowing it to dry for 30 minutes at 25° C.

FORMULA B

|  | Parts |
|---|---|
| Alkyd resin solution [1] | 18.0 |
| Urea formaldehyde resin, 60% solution in butanol | 2.0 |
| Iron oxide | 11.5 |
| Aluminum silicate | 9.0 |
| Barytes | 28.8 |
| Aromatic solvent B.R. 190–210° C. | 16.0 |
| Aliphatic solvent B.R. 190–250° C. | 14.7 |
|  | 100.0 |

[1] A 55% solution in xylene of a 40% oil-length dehydrated castor oil modified glyceryl-ethylene glycol phthalate alkyd resin having an acid number of 8 and a content of unesterified hydroxyl groups equal to 4.1% glycerol.

A polyurethane adhesive composition is prepared by (a) charging a reaction vessel (equipped with stirrer, thermometer, reflux condenser and nitrogen inlet) with 3110 parts polypropylene glycol (molecular weight 2000), 20 parts petroleum naphtha (boiling range 88 to 142° C.), 180 parts carbon black and 3080 parts finely-divided calcium carbonate; (b) stirring the contents of the vessel while heating for one hour at 71 to 93° C. under a vacuum of 20 mm. mercury and simultaneously removing all of the petroleum naphtha along with any water present in the vessel; (c) cooling the mixture to 70° C.; (d) adding 544 parts of tolylene 2,4-diisocyanate and stirring the reaction mixture for two hours at a temperature of 71 to 93° C.; (e) adding 1550 parts of a triol having an average molecular weight of about 6000 and a hydroxyl value of 28 prepared by condensing about 100 moles of propylene oxide with one mole of 1,2,6-hexanetriol, and stirring the resulting mixture for five minutes; (f) adding 0.25 part stannous octoate and stirring the mixture at 82 to 93° C. for two hours; (g) mixing 87 parts of the resulting liquid polyurethane composition with 13 parts of petroleum naphtha (B.R. 88–152° C.); and (h) mixing 94 parts of the resulting composition with six parts of pyrogenic silica having an average particle size of 0.01 micron ("Cabosil" M–5).

The bonding operation is completed by (1) extruding a strip of the polyurethane adhesive measuring ¼-inch wide and ¼-inch thick onto the primed periphery of the windshield, (2) mounting the resulting assembly in place on the steel windshield-receiving member so that the polyurethane adhesive is in interposed contact with the entire periphery of the windshield and the steel member, and (3) keeping the layers of the assembly in intimate contact with each other while the polyurethane composition is converted to a solid polyurethane elastomer by allowing the assembly to stand for seven days at 25° C. and 50% relative humidity.

The windshield is now integrally bonded to the steel body member. The bond is strong, resilient and impervious to fluids and dust when the automobile is subjected to normal use conditions; also the bond has high resistance to degradation by sunlight.

EXAMPLE IB

Results similar to those described in Example IA are obtained by repeating Example IA except the polyurethane adhesive composition is prepared by (a) charging a reaction vessel (equipped with stirrer, thermometer, reflux condenser and nitrogen inlet) with 3110 parts polypropylene glycol (molecular weight 2000), 650 parts petroleum naphtha (B.R. 88–142° C.), 180 parts carbon black and 3080 parts finely-divided calcium carbonate; (b) stirring the contents of the vessel while heating to reflux temperature and continuing to stir at this temperature for two hours; (c) removing all of the petroleum naphtha along with any water present in the vessel by distillation; (d) cooling the mixture to 90° C.; (e) adding 780 parts of 4,4'-diphenyl-methane-diisocyanate and stirring the mixture for five minutes; (f) adding 0.25 part stannous octoate and stirring the mixture of 100° C. for 45 minutes; (g) adding 1550 parts of a triol having an average molecular weight of about 6000 and a hydroxyl value of 28 prepared by condensing about 100 moles of propylene oxide with one mole of 1,2,6-hexanetriol, and stirring the resulting mixture at 100° C. for two hours; (h) mixing 87 parts of the resulting liquid polyurethane composition with 13 parts of petroleum naphtha (boiling range 88–142° C.); and (i) mixing 94 parts of the resulting composition with six parts of pyrogenic silica having an average particle size of 0.01 micron ("Cabosil" M–5).

EXAMPLE IC

Results similar to those described in Example IA are obtained by repeating Example IB except in preparing the polyurethane adhesive composition the 780 parts of 4,4'-diphenyl-methane-diisoycanate used in step (e) are replaced with 544 parts of tolylene-2,4-diisoycanate.

EXAMPLE II

Part A

A lap joint is prepared as follows for testing properties of a bond obtained between glass and steel articles in accordance with the invention:

(a) A sheet of plate glass having a thickness of ¼ inch, a width of 1 inch and a length of 4 inches is cleaned and primed on one side as the windshield is in Example IA.

(b) A sheet of autobody steel having a thickness of ¹⁄₁₆ inch, a width of 1 inch and a length of 4 inches is zinc phosphate coated, primed and painted on one side as the steel member is in Example IA.

(c) The glass sheet is placed primed-side-up on a bench top and the metal sheet is placed painted-side-down so that part of it is in superposed contact with the glass sheet and so that there is a ½-inch end-to-end overlap of the two sheets.

(d) The metal sheet is removed and a strip of the polyurethane adhesive described in Example IB measuring 1 inch long, ¼ inch wide and ¼ inch thick is extruded onto the portion of the glass sheet which had been in contact with the metal sheet.

(e) The metal sheet is returned to the position described in step (c) so that the adhesive strip lies in interposed contact with the overlapped portions of the two sheets and one edge of the adhesive strip lies in the same vertical plane as the overlapped end of the metal sheet.

(f) The layers of the assembly are kept in intimate contact with each other while the polyurethane adhesive is converted to a solid polyurethane elastomer by allowing the assembly to stand for seven days at 25° C. and 50% relative humidity.

The resulting lap joint is tested on an Instron Tensile Test Machine at a chart speed of 10 inches per minute and a crosshead speed of 1 inch per minute using a full scale load of 100 pounds on the "D" cell. The direction of force is parallel to the longest side of the test assembly. The bond has a lap shear value of 240 p.s.i. The breakage occurs within the layer of polyurethane adhesive (cohesive failure); thus the Formula A primer remains bonded to the glass and the polyurethane elastomer remains bonded to the primer.

Useful results are obtained when Part A above is repeated except the silane compound of the primer applied to the glass sheet is beta-(3,4-epoxy-cyclohexyl)-ethyl-trimethoxy - silane or gamma - aminopropyl-triethoxy-silane.

Part B

Another lap joint is prepared as described above in Part A, and the bonded assembly is placed in a conventional accelerated weathering machine wherein the assembly is subjected intermittently to a spray of water and to the actinic light of a sunlamp. The glass surface of the assembly faces the sunlamp. The assembly remains in the weathering machine for an extended period of time until it has been subjected to 2400 langleys (of ultraviolet radiation); a langley is a unit of solar radiation equal to one gram calorie per square centimeter of irradiated surface. Then the assembly is transferred to an Instron Machine and tested in the manner described above with substantially the same results. Thus, the accelerated weathering causes substantially no reduction in the strength of the bond.

Part C

For purposes of comparison, a lap joint outside the scope of the present invention is prepared as described above in Part A except the application of primer to the cleaned glass consists of wiping the glass with a clean cheesecloth wet with a primer consisting of a 2% solution in ethanol of gamma-aminopropyl-triethoxysilane and allowing the primer to dry for 30 minutes at 25° C.

The bonded assembly is placed in a weathering machine as described above in Part B. After being subjected to only 200 langleys in the weathering machine, the assembly is tested in an Instron Machine as described in Part A. The bond has a lap shear value of 50 p.s.i.; the breakage occurs at the glass/polyurethane interface (adhesive failure).

Part D

Also for purposes of comparison, a lap joint outside the scope of the present invention is prepared as described in Part C above except the primer which is wiped onto the glass consists of a 2% solution in ethanol of gamma-glycidoxy-propyl-trimethoxy-silane. The bond has very little strength; it is even weaker than the bond of Part C and it is easily broken by hand. The breakage occurs at the glass/polyurethane interface.

EXAMPLE IIIA

Two sheets of glass are resiliently and sealingly bonded to each other by repeating Part A of Example II except the sheet of steel of step (b) is replaced with a sheet of glass prepared as described in step (a). After the assembly is subjected to 2400 langleys in the weathering machine described in Part B of Example II, the two sheets of glass are still strongly bonded together. When the bond is broken on an Instron Machine, the breakage occurs within the polyurethane adhesive layer; the primer remains bonded to the glass and the polyurethane adhesive remains bonded to the primer.

EXAMPLE IIIB

Results similar to those described in Example IIIA are obtained by repeating that example except the two sheets of glass are replaced with two sheets of ¼-inch thick clear acrylic plastic (polymethyl methacrylate), both sheets being cleaned and primed on one side as the windshield is in Example IA.

I claim:
1. A composite article comprising:
   (a) a layer of glass or acrylic plastic,
   (b) a dried layer of the film-forming composition defined below in adherent superposed contact with layer (a),
   (c) a layer of polyurethane elastomer in adherent superposed contact with layer (b), and
   (d) in adherent superposed contact with layer (c), a layer of a solid material from the group consisting of metal, glass, wood, plastic, leather, cement compositions and ceramics;
said film-forming composition used in forming layer (b) being a dispersion in a volatile organic liquid of
   (A) about 30 to 80% of a polymer of methyl methacrylate containing an amino residue, as described below,
   (B) about 0.1 to 40.0% of a silane compound selected from the group consisting of (1) those which contain an epoxy group, (2) gamma-aminopropyl-triethoxysilane and -trimethoxysilane and (3) N,N'-bis(hydroxyethyl)-gamma-aminopropyl - triethoxysilane and -trimethoxysilane, and
   (C) about 0.6 to 10.0% of an opaque pigment, said percentages being based on the total weight of non-volatile ingredients in the composition; and said polymer (A) being predominantly of methyl methacrylate having a relative viscosity of about from 1.117 to 1.196 and consisting essentially of polymerized methyl methacrylate and radicals of the formula:

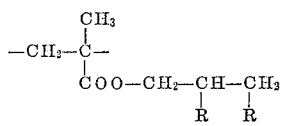

wherein one R is a hydroxyl group and the second R is an amino residue of a member of the class consisting of ammonia and primary and secondary monoamines, said residue being bonded through amino nitrogen, said radical exclusive of amino residue constituting about from 3 to 0.2% by weight of the total weight of polymer.

2. An article according to claim 1 wherein said film-forming composition also contains about 1 to 40% (based on the weight of non-volatile ingredients) of an acrylic polymer from the group consisting of poly(alkyl acrylates) and poly(alkyl methacrylates) wherein the alkyl radical contains 1 to 8 carbon atoms.

3. An article according to claim 1 wherein layer (a) is an automobile windshield and layer (d) is the windshield-receiving member of an automobile body.

4. An article according to claim 1 wherein layer (d) is a solid layer of glass having a dried layer of said film-forming composition in adherent contact with the surface facing layer (c).

References Cited
UNITED STATES PATENTS

| | | | |
|---|---|---|---|
| 2,949,383 | 8/1960 | Blake | 117—72 |
| 2,949,445 | 8/1960 | Blake | 117—124 X |
| 2,962,471 | 11/1960 | Lang et al. | 260—827 X |
| 3,135,645 | 6/1964 | Burkley et al. | 161—165 |
| 3,334,008 | 8/1967 | Park et al. | 161—193 |
| 3,350,345 | 10/1967 | Vanderbilt et al. | 156—329 X |
| 3,423,376 | 1/1969 | Cobran et al. | 161—193 X |

JOHN T. GOOLKASIAN, Primary Examiner

R. A. KILLWORTH, Assistant Examiner

U.S. Cl. X.R.

156—329, 332; 161—193, 204, 254; 260—41, 86.1, 824